US008217893B2

(12) United States Patent
Quinn et al.

(10) Patent No.: US 8,217,893 B2
(45) Date of Patent: Jul. 10, 2012

(54) INERTIAL SENSOR-BASED POINTING DEVICE WITH REMOVABLE TRANSCEIVER

(75) Inventors: Thomas J. Quinn, Los Gatos, CA (US); Lex M. Bayer, Palo Alto, CA (US)

(73) Assignee: Thomson Licensing, Boulogne (FR)

( * ) Notice: Subject to any disclaimer, the term of this patent is extended or adjusted under 35 U.S.C. 154(b) by 739 days.

(21) Appl. No.: 11/922,469

(22) PCT Filed: Dec. 9, 2005

(86) PCT No.: PCT/US2005/044593
§ 371 (c)(1),
(2), (4) Date: Dec. 18, 2007

(87) PCT Pub. No.: WO2007/067181
PCT Pub. Date: Jun. 14, 2007

(65) Prior Publication Data
US 2009/0033621 A1 Feb. 5, 2009

(51) Int. Cl.
*G06F 3/033* (2006.01)
*G09G 5/08* (2006.01)
(52) U.S. Cl. ........................... 345/157; 345/163
(58) Field of Classification Search .......... 345/156–160, 345/162–163
See application file for complete search history.

(56) References Cited

U.S. PATENT DOCUMENTS

| 5,247,137 | A | | 9/1993 | Epperson | |
|---|---|---|---|---|---|
| 5,294,792 | A | | 3/1994 | Lewis et al. | |
| 5,440,326 | A | | 8/1995 | Quinn | |
| 5,898,421 | A | * | 4/1999 | Quinn | 345/156 |
| 6,587,053 | B1 | * | 7/2003 | Lee | 340/12.55 |
| D542,789 | S | * | 5/2007 | Depay | D14/435.1 |
| D546,328 | S | * | 7/2007 | Kobayakawa | D14/480.4 |
| 2001/0027530 | A1 | * | 10/2001 | Yen et al. | 713/300 |
| 2003/0086433 | A1 | * | 5/2003 | Tordera et al. | 370/419 |
| 2003/0167345 | A1 | * | 9/2003 | Knight et al. | 709/249 |
| 2004/0015625 | A1 | * | 1/2004 | Ayatsuka et al. | 710/62 |
| 2004/0073672 | A1 | * | 4/2004 | Fascenda | 709/225 |
| 2004/0104891 | A1 | * | 6/2004 | Sacca et al. | 345/156 |
| 2004/0117513 | A1 | * | 6/2004 | Scott | 710/1 |

(Continued)

FOREIGN PATENT DOCUMENTS
EP 1 441 279 A 7/2004
(Continued)

OTHER PUBLICATIONS
Search Report Dated May 8, 2006.

*Primary Examiner* — Amare Mengistu
*Assistant Examiner* — Gene W Lee
(74) *Attorney, Agent, or Firm* — Robert D. Shedd; Vincent E. Duffy; Michael A. Pugel

(57) ABSTRACT

An inertial sensor-based pointing device 10 is compatible with a removable USB pod 14 having a digital flash memory 32 and an integrated radio transceiver 30. Flash memory 32 can be used by a user to store software that enables a user to auto load software applications into compatible computers. Pointing device 10 is adapted to receive USB pod 14 resulting in a combined memory/transceiver and pointing device system that can be conveniently carried as a single unit in a pocket or via a belt clip.

20 Claims, 3 Drawing Sheets

U.S. PATENT DOCUMENTS

| | | | |
|---|---|---|---|
| 2004/0212589 A1* | 10/2004 | Hall et al. | 345/156 |
| 2004/0217941 A1* | 11/2004 | Chen | 345/158 |
| 2004/0219949 A1* | 11/2004 | Su et al. | 455/558 |
| 2004/0243726 A1 | 12/2004 | O'Keefe et al. | |
| 2005/0164532 A1* | 7/2005 | Ni et al. | 439/79 |
| 2005/0181645 A1* | 8/2005 | Ni et al. | 439/79 |
| 2005/0219208 A1* | 10/2005 | Eichenberger et al. | 345/157 |
| 2005/0253806 A1* | 11/2005 | Liberty et al. | 345/156 |
| 2006/0039146 A1* | 2/2006 | Wu | 362/251 |
| 2006/0044270 A1* | 3/2006 | Chen | 345/163 |
| 2006/0256085 A1* | 11/2006 | Tsai et al. | 345/163 |
| 2007/0057763 A1* | 3/2007 | Blattner et al. | 340/5.52 |

FOREIGN PATENT DOCUMENTS

| | | |
|---|---|---|
| GB | 2 328 496 A | 2/1999 |
| JP | H05-080925 | 4/1993 |
| JP | 2002-73274 | 2/2002 |
| JP | 3-109762 | 7/2005 |
| JP | 2005-284990 | 10/2005 |
| WO | WO02059869 | 8/2002 |

* cited by examiner

INERTIAL SENSOR-BASED POINTING DEVICE WITH REMOVABLE TRANSCEIVER

This application claims the benefit under 35 U.S.C. §365 of International Application PCT/US2005/044593, filed Dec. 9, 2005, which was published in accordance with PCT article 21(2) on Jun. 14, 2007 in English.

FIELD OF THE INVENTION

The present invention relates to the field of hand-held computer or entertainment system control devices. More specifically, the present invention relates to a hand-held inertial pointing device irremovably coupled to a memory storage.

BACKGROUND OF THE INVENTION

Historically, computer instructions have taken the form of commands entered as words on a keyboard. More recently, pointing devices and icon-based interface techniques have been developed which permit a computer user to select tasks and to enter commands by moving a cursor on a computer display screen in response to movement of a pointing device. Pointing devices used for this task have included joysticks, trackballs and mouse controllers. One early use of a mouse was as a pointing device for an icon-based computer interface. More recently, the mouse has become well known as a computer input device used with various lines of computers and workstations. However, one drawback associate with the use of a conventional mouse is that the mouse requires a relatively large and flat 2-dimensional surface on which to move. Typically, this surface must be unobstructed, dedicated to mouse movement and measure over 9"×9". Thus, conventional mice are limited to use on a surface for practical applications.

The need for a hand-held computer control device which has a long range and high resolution, free of flat surface or confined space constraints, and which responds to a vector defined by the controller, i.e., responds to "pointing" of the controller, as opposed to merely detecting the position of the controller was met by Quinn, U.S. Pat. No. 5,440,326, "Gyroscopic Pointer," and Quinn, U.S. Pat. No. 5,898,421, "Gyroscopic Pointer and Method." However, these gyroscopic pointers have a number of limitations. For example, the gyroscopic pointers require an associated computer to contain the data, programs and applications that a user desires to manipulate. Furthermore, each gyroscopic pointer requires the associated computer to have the pointer's computer control program downloaded thereon.

Accordingly, it is desirable to integrate a wireless handheld inertial pointing device with a removable pod housing a transceiver and memory. With this integrated device, the user now has the ability to carry data and a computer control system as a single unit in the user's pocket or via belt clip.

SUMMARY OF THE INVENTION

The preferred embodiment of the present invention comprises a hand-held inertial sensor-based pointing device adapted for use as a cursor control device for a computer, coupled to a removable pod housing a transceiver and digital memory.

The inertial sensor is preferably a gyroscope where the resulting electrical output of manipulation by a user is converted into a format usable by a computer to control the x-y movement of a cursor on a two dimensional display screen of a computer display. The resulting controller device is thus responsive to a vector defined by the controller, i.e. the "pointing" of the controller, as opposed to merely detecting its position. The vector information (i.e. "pitch" and "roll") is transformed directly into the "x" and "y" coordinates of a cursor position on a computer display. The controller thus responds to angular movements of a user's hand, which permits relatively large and accurate movements of a cursor to be accurately defined without requiring correspondingly large and tiring hand movements.

The removable pod houses a USB radio transceiver and flash memory. The memory may be used by a user to store programs and/or data and enable the user to auto load software applications to compatible computers. A user may use this device to transport presentations in flash memory, use the pointing device as a mobile presentation remote, and use various presentation tools stored in the flash memory to facilitate a presentation. The device may also be used to transport music, games, or pictures on flash memory, browse and interact with content using the device, and enhance the user's experience with additional software.

One inventive benefit is the ability to carry data and a cursor control system together in a user's pocket or via belt clip. This should encourage users to leave behind their personal notebook computers and rely upon the integrated device for immediate access and control of data, programs and personal user profile information on compatible computers.

These and other advantages and features of the invention will become readily apparent to those skilled in the art after reading the following detailed description of the invention and studying the accompanying drawings.

DETAILED DESCRIPTION

Figure 1:
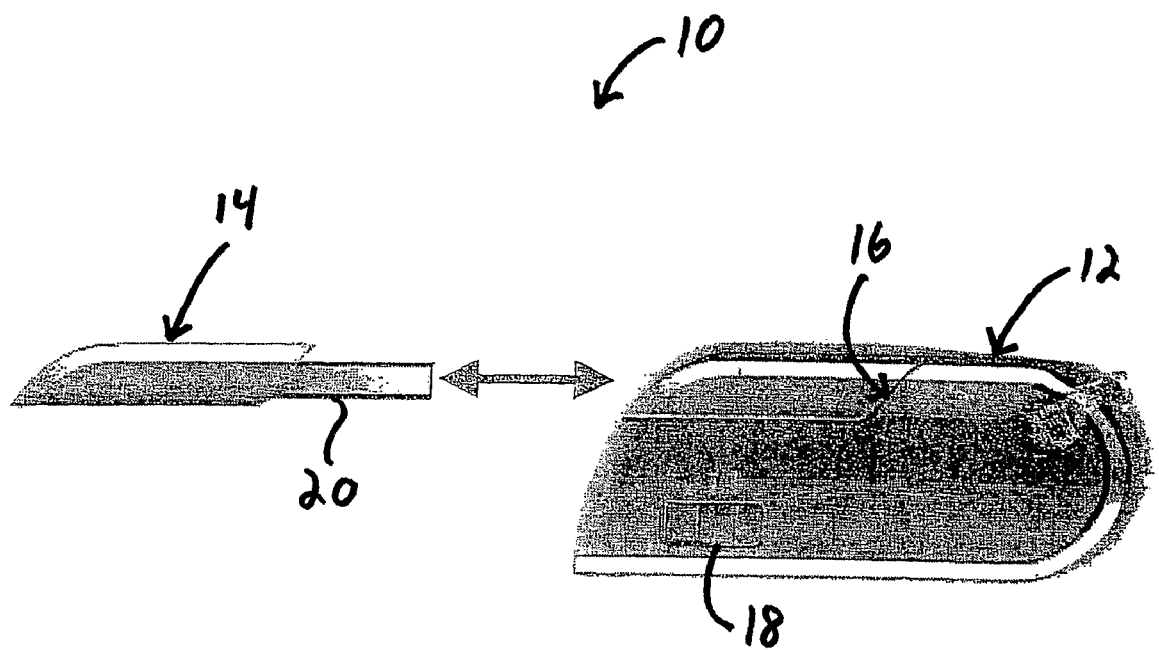
FIG. 1 is a side view of an inertial sensor-based pointing device with a removable pod in accordance with the present invention.

The following is a detailed description of the presently preferred embodiments of the present invention. However, the present invention is in no way intended to be limited to the embodiments discussed below or shown in the drawings. Rather, the description and the drawings are merely illustrative of the presently preferred embodiments of the invention.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Referring now to FIG. 1, a side view of one embodiment of the present invention is illustrated. Inertial sensor-based pointing device 10 comprises a main housing 12 and a removable pod 14. Main housing 12 includes a USB port 16 and a switch 18 with multiple settings. Removable pod 14 contains a USB fitting 20. The USB port 16 of the main housing 12 and the USB fitting 20 of the removable pod 14 are standard connections known in the art. The USB port 16 and fitting 20 allow the removable pod 14 to be detachably connected to the main housing 12 to created an integrated sensor-based pointing device 10, as will be discussed in further detail below.

Figure 2:
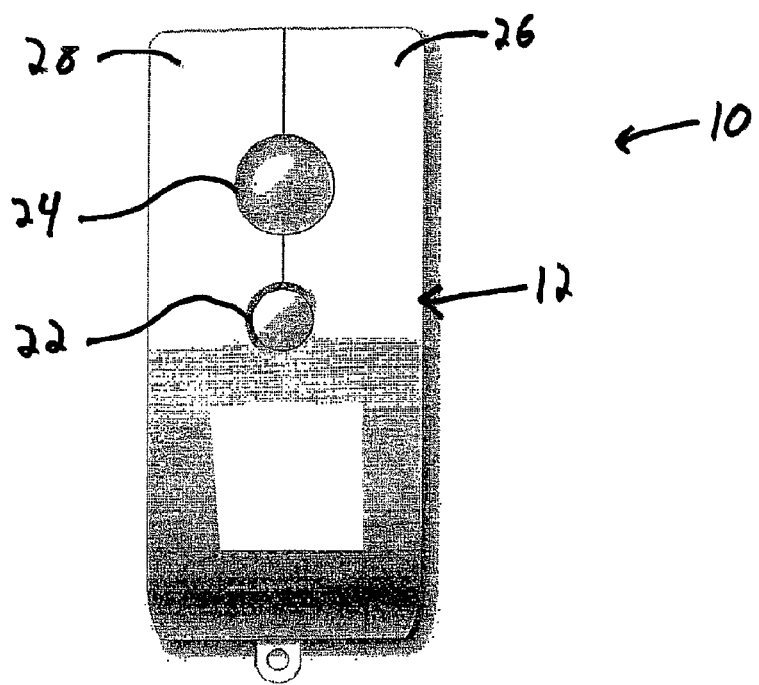
FIG. 2 is a top view of the inertial sensor-based pointing device of FIG. 1.

Referring now to FIG. 2, a top view of an embodiment of the present invention is illustrated. The main housing 12 of the sensor-based pointing device 10 includes a gyro swiping button 22, a gyro activation button 24, a right select button 26, and a left select button 28. Pointing device 10 is specifically designed to be portable, so it can be carried by a user in his pocket or via a belt clip. Pointing device 10 is small and light enough so that a user may hold it in the palm of his hand and control the graphical user interface of a computer system. Pointing device 10 is approximately 20 mm×34 mm×61 mm. Pointing device 10 is made of plastic and metal. In another embodiment, pointing device 10 may be made of other similar durable material.

Gyro swiping button 22 is made of plastic. In another embodiment, gyro-swiping button 22 may be made of rubber or other similar durable material. Gyro swiping button 22 allows the user to set up a number of macros—key combinations assigned to specific functions on pointing device 10. Software is used to set up macros onto pointing device 10. Software is installed by running the software application on a computer, plugging USB fitting 20 into the computer's USB port 16, and saving the application onto a memory contained within the removable pod 14.

In another embodiment, it may be possible to activate the macros without using gyro-swiping button 22. For example, macros may be activated by pressing and holding down right select button 26, double-clicking right select button 26, clicking right select button 26 and left select button 28 in rapid succession, gesturing pointing device 10 vertically, or gesturing pointing device 10 horizontally.

Gyro activation button 24 is made of plastic. In another embodiment, gyro activation button 24 may be made of rubber or other similar durable material. As discussed in further detail below, gyro activation button 24 activates inertial sensors contained within main housing 12.

Right select button 26 and left select button 28 operate in a similar fashion as left/right buttons on a standard two-button mouse. When a force is exerted on either right select button 26 or left select button 28, a internal switch (not shown) is activated and a transmitter (discussed in further detail below) wirelessly sends the signal to a receiver connected to a computer system. The receiver signals are interpreted by the computer and are used to manipulate a cursor on a graphical user interface. When no forces are exerted upon buttons 26 and 28, the internal switch resets and a signal is electrically transmitted to the computer. Switches such as those contemplated for use in pointing device 10 are well known to those skilled in the art. Pressing either select button also reactivates pointing device 10 if it has been in "sleep" mode.

Figure 3:
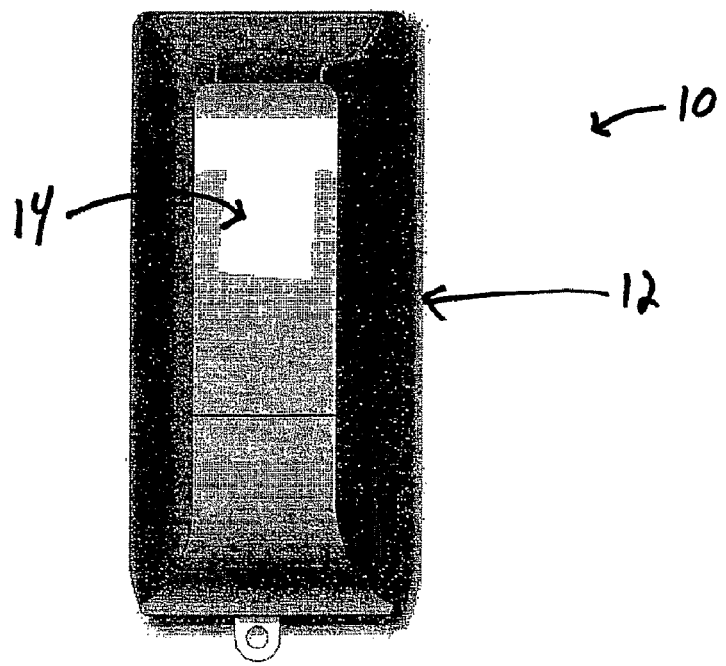
FIG. 3 is a bottom view of the inertial sensor-based pointing device of FIG. 1.

Referring now to FIG. 3, a bottom view of an embodiment of the present invention is shown. As shown, the housing 12 and pod 14 of the pointing device 10 are coupled together.

Figure 4:
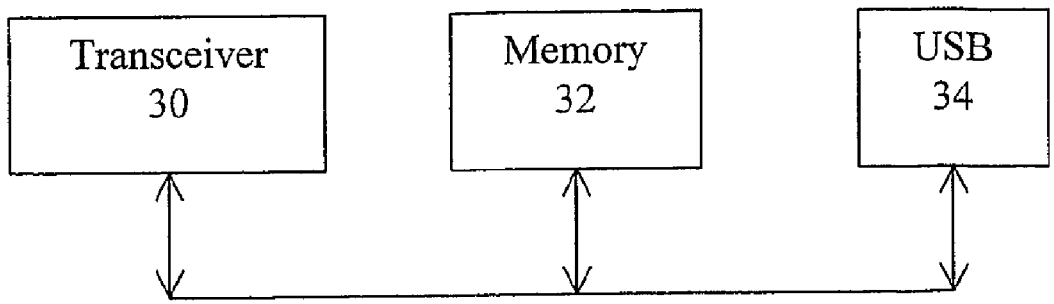
FIG. 4 is a block diagram illustrating the elements of the inertial sensor-based pointing device's removable pod.

Referring now to FIG. 4, a block diagram illustrating the internal elements of the removable pod 14 is shown. Removable pod 14 includes a wireless transceiver 30, a memory 32 and a USB interface 34. Transceiver 30 is used to transmit and receive data. In the preferred embodiment, transceiver 30 is a radio frequency (RF) device compatible with wireless receivers such as the commonly available wireless keyboards and mice on the market for personal computers. For example, transceiver 30 may be compatible with wireless RF communications protocols such as the IEEE 802.11a/b/g, bluetooth and ultra wideband communications protocols.

Memory 32 may be a digital memory used to store data (i.e., documents, music files, presentations, user profiles, setting preferences and the like). Memory 32 is preferably in the form of flash memory, however other forms of memory may be employed. Flash memory is a non-volatile form of memory that does not need power to maintain the information stored. In addition, flash memory offers fast read access times and better shock resistance than hard disk. These characteristics make flash memory particularly useful for storage applications on battery-powered devices like pointing device 10. Flash memory is more commonly used in the following media formats: RS-MMC (Reduced Size MultiMedia Card), the TransFlash and miniSD variants of Secure Digital and the new USB/Memory card hybrid Intelligent Stick. Newer formats exhibit a greatly reduced size. While certain manufacturers have developed flash memory capable of storing eight gigabytes, the storage capacity should further increase in the future. Memory 32 may be preloaded with presentation software to assist in the operation of the presentation. Memory 32 can also be used to transport music, games, or pictures, browse and interact with content using the device, and enhance the user's experience with additional software. Memory 32 may also be preloaded with GyroTools Media Controls Software available from Gyration, Inc., which provides over fifty dynamic Internet, Media, Input, Windows and General tools for fingertip controls, easy access and customization.

USB interface 34 includes the standard USB drivers and processors known to those skilled in the art. USB interface 34 is coupled to transceiver 30, memory 32 and the USB fitting 20 that protrudes from one end of pod 14 such that data and applications stored in memory 32 or signals received by transceiver 30 can be passed to the USB fitting 20 via the USB interface 34.

During use, data stored in digital memory 32 can be exchanged with computer system data in numerous ways. For example, the pod 14 can be plugged into the USB port of a computer system and data can be exchanged between the computer system and digital memory 32 via the USB interface 34. Alternatively, data can be wirelessly exchanged between the computer and digital memory 32 via transceiver 30.

Figure 5:
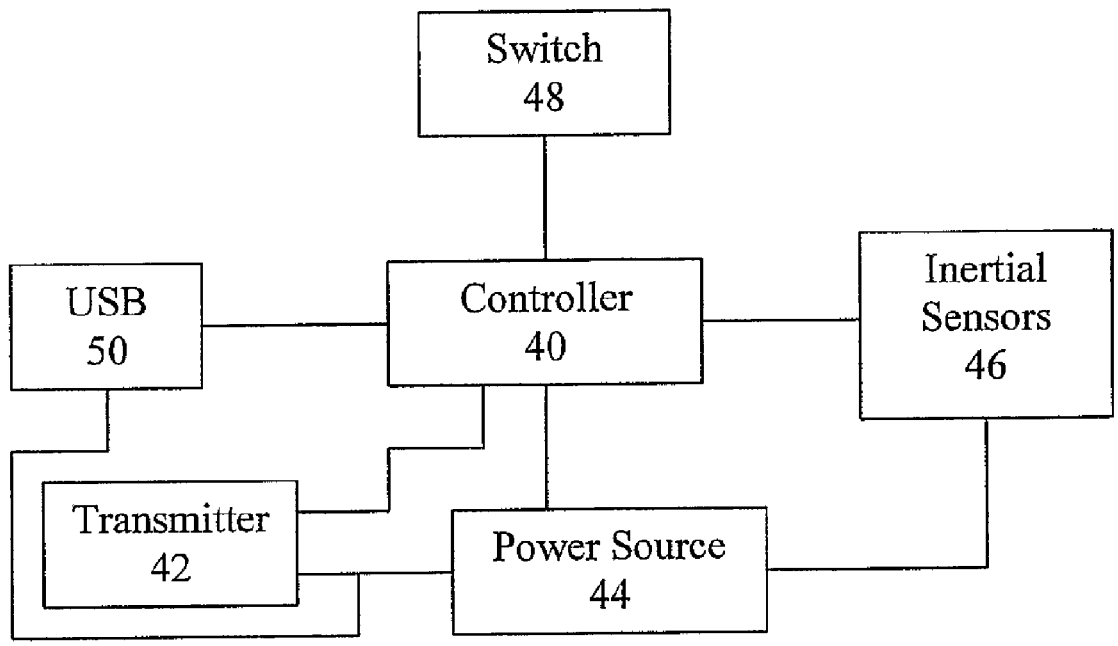
FIG. 5 is a block diagram illustrating the elements of the inertial sensor-based pointing device's housing.

Referring now to FIG. 5, a block diagram illustrating the internal elements of the main housing 12 of the sensor-based pointing device 10 is shown. Main housing 12 includes a controller 40, transmitter 42, power source 44, inertial sensors 46, switch interface 48 and a USB port 50. Power source 44 supplies energy to controller 40, transmitter 42, inertial sensors 46 and USB port 50. Power source 44 is preferably a rechargeable nickel metal hydride battery. The nickel metal hydride battery holds a charge for approximately 13 hours of continuous use. Pointing device 10 is recharged in a rechargeable cradle (not shown). Pointing device 10 also has two charge modes. The first charge mode is a quick charge mode and the second charge mode is a slower charge mode. Although the first charge mode quickly charges the pointing device 10, the second charge mode reduces the risk of over charging the battery of pointing device 10 and thereby reduces the risk of battery deterioration. The first charge mode begins immediately upon placing pointing device 10 in the rechargeable cradle. This first charge lasts for one hour. The second charge mode commences once the first charge mode ends. Pointing device 10 remains in this second charge mode for four hours. Thereafter, pointing device 10 returns to the first charge mode. If pointing device 10 is low on power, pointing device 10 is charged at the second charge mode immediately upon being placed in the rechargeable cradle.

In another embodiment, pointing device 10 may also be powered by an AC adaptor which converts AC voltage into DC voltage that is compatible with the operation of the pointing device 10. Power source 44 of sensor-based pointing device 10 may also be recharged by a standby battery. The standby battery allows a user to maintain a full charge on a spare battery.

Inertial sensors 46, such as gyroscopes, produce x and y position signals that correspond to the movement of pointing device 10. These x and y position signals related to the movement of pointing device 10 are coupled to transmitter 42 and transmitted to a compatible receiver or to the wireless transceiver 30 of pod 14, as discussed in further detail below. The received signals are interpreted by the computer and are used to manipulate a cursor on a graphical user interface display.

One exemplary inertial sensor 46 may be a dual-axis miniature rate gyroscope module that is integrated into pointing device 10. The gyroscope may have a tri-axial vibratory structure that offers high reliability, and internal mounting that isolates the vibrating elements thereby greatly decreasing drift and improving shock resistance. The gyroscope module may be mounted to a printed circuit board, without additional shock mounting. The gyroscope module may have an electromagnetic transducer design and a single etched beam structure utilizes the Coriolis effect to sense rotation in two axes simultaneously. The gyroscope module may include an integrated analog-to-digital converter (ADC) and may communicate via a conventional two-wire serial interface bus allowing the module to be directly connected to controller 40. The gyroscope module may have low current consumption that may be enhanced by a low current sleep mode. The gyroscope module may include a temperature sensor and a voltage sensor that facilitates simple detection of a low battery condition. The gyroscope module may further include 1K-bit of EEPROM storage.

As discussed above, gyro activation button 24 activates the inertial sensors 46 coupled to main housing 12. When an operator uses pointing device 10, inertial sensors produce x and y position signals that correspond to the movement of pointing device 10. These x and y position signals related to the movement of the device are forwarded to controller 40. The x and y position signals may be transmitted to a computer system using various transmission arrangements discussed in further detail below. The received signals are interpreted by the computer and are used to manipulate a cursor on a graphical user interface display. Gyro activation button 24 permits the user to activate, move, reorient, and reactivate the pointing device 10 as needed.

Controller 40, via switch interface 48, detects the setting of switch 18. When switch 18 is set to a first a setting, controller 40 configures transmitter 42 to communicate with a compatible receiver or to the wireless transceiver 30 of pod 14 using a first address. When switch 18 is set to a second a setting, controller 40 configures transmitter 42 to communicate with a compatible receiver or to the wireless transceiver 30 of pod 14 using a second address. These multiple addresses are intended to be used for RF communication with different computers. More specifically, the first address may be used with a first computer (i.e. work computer) and the second address may be used with a second computer (i.e. home computer). The addresses are 6-digit codes which prevents incidental control from other devices in the area. In another embodiment, these settings may be preset, set internally or may be programmable.

Referring now to FIGS. 1-5, the operation of the sensor-based pointing device 10 is discussed. Sensor-based pointing device 10 can operate in two modes. The first mode is a separated mode wherein pod 14 is detached from housing 12 and inserted into a USB port of a computer to be controlled by pointing device 10. The second mode is an integrated mode wherein pod 14 is attached to housing 12 and a separate transceiver station (not shown), either connected or integrated within the computer, is provided.

Turning first to the separated mode, a user detaches pod 14 from housing 12 and inserts the USB fitting 20 of the pod 14 into a USB port of a computer that the user desires to control using pointing device 10. The computer will provide power to the pod 14 via the computer's USB port. Once the pod 14 is connected to the computer the pod 14 provides two functions. First, pod 14 acts a USB flash drive that contains file and runs applications. More specifically, the files and applications stored on memory 32 can either be launched from memory 32 or downloaded from memory 32 onto the computer. For example, a computer control application (i.e., the GyroTools application) can be launched from memory 32 such that pointing device 10 can remotely control the computer. Second, pod 14 acts as a computer-side transceiver which communicates with the USB bus of the computer. More specifically, the transceiver 30 of the pod 14 receives signals, such as the x and y position signals, from the transmitter 40 of pointing device 10 and passes the signals to the computer's USB bus via USB interface 34 and USB fitting 20.

Turning next to the integrated mode, the user connects pod 14 to housing 12 and attaches a separate transceiver station (not shown) to the USB port of the computer. Alternatively, the computer may have an integrated transceiver. In this mode the power source 44 of housing 12 provides power to the transceiver 30 and memory 32 of pod 14 via the connection between the pods USB fitting and the housing's USB port 50. The pointing device 10 communicates with the computer's transceiver by transmitting x and y position signals from controller 40 using transmitter 10 and communicating other data, files or applications from memory 32 using transceiver 30. In an alternative embodiment, housing 12 has an integrated transceiver and pod 14 does not such that x and y position signals from controller 40 and data, files or applications from memory 32 are both communicated to the computer's transceiver using the housing's integrated transceiver.

As discussed above, pointing device 10 is used as a mobile presentation remote. A user stores data, including presentations, GyroTools, music, games, pictures, etc., in flash memory 32. Pointing device 10 is carried by the user in his pocket or via a belt clip to a presentation. Before the presentation, the user can load the presentation onto the compatible computer system from the flash memory 32. During the presentation, the user can comfortably hold the small, light weight pointing device 10 in one hand and control the functions of the graphical user interface by manipulating right select button 26, left select button 28, gesturing pointing device 10 vertically, and gesturing pointing device 10 horizontally. Pointing device 10 responds to small and subtle wrist movements in mid-air. Pointing device 10 responds to angular movements of a user's hand, which permits relatively large and accurate movements of a cursor to be accurately defined without requiring correspondingly large and tiring hand movements. Pointing device 10 is not "line-of-sight" and can be held in comfortable position.

It should be noted that pod 14 may be used to transport user profile and preference info for gamers. This is useful because gamers often play on various game consoles that don't contain their game profile and preferences. The game profile and preferences are typically critical for game performance. The pointing device's swipes feature can be used to unlock security features or user profile info after the connection of the pod 14 has been made to the foreign computer. This use of the pod 14 can also be applied to home or hotel entertainment system. For example, upon entering a hotel room a user can insert the pod 14 into the USB port of a TV, initiate a security swipe using pointing device 10 to access the user's email or to cause the user's TV entertainment profiles to be uploaded into the TV or hotel network. As discussed above, the pod 14 can also be used to transport audio, photo and videos as well.

Another advantage of pointing device 10 is that its size is small and its shape is ergonomic. The size and shape of pointing device 10 allows users to grasp and more precisely position pointing device 10. This improved hand position allows users to more naturally move pointing device 10. Pointing device 10 also includes additional clips, loops, or other similar features to facilitate transportation and prevent loss or dropping.

In another embodiment, pointing device 10 may be a 2.4 Cordless Optical Air Mouse made available from Gyration, Inc. The Optical Air Mouse has a digital spread spectrum 2.4 GHz technology with auto frequency hopping. It contains 80 Frequencies, 800 virtual channels, and an auto channel select feature. The Optical Air Mouse frees a user from the confines of his/her desk and allows him/her to be mobile up to 30' away from the computer with no line-of-sight limitations.

While the present invention has been described in terms of a preferred embodiment above, those skilled in the art will readily appreciate that numerous modifications, substitutions and additions may be made to the disclosed embodiment without departing from the spirit and scope of the present invention. For example, although the sensor-based pointing device has been described above for use with a computer, those skilled in the art will readily appreciate that the inventive sensor-based pointing device may be utilized with any similar electronic device and that the present invention is in no way limited to mechanisms described above. Further, while the preferred embodiment has been taught using a USB interconnect between the pointing device and the memory, other forms of couplings, as even a fixed connection, could be used. It is intended that all such modifications, substitutions and additions fall within the scope of the present invention which is best defined by the claims below.

What is claimed is:

1. A hand-held wireless graphical input device comprising:
   a housing adapted for being held by one hand in free space, the housing generating, using inertial sensors comprising vibrating elements, graphic input signals for controlling a position of a cursor on a graphics display, and transmitting said graphic input signals substantially only while an actuation button is depressed; and
   a pod, detachable from said housing, comprising:
      a memory,
      a connector, and
      a wireless transceiver,
   wherein when said pod is detached from said housing and connected to a computing device via said connector, said wireless transceiver is powered by said computing device and is operable to receive the graphic input signals generated using said inertial sensors comprising vibrating elements in said housing and transmit the graphic input signals and the data from said memory via said connector to said computing device associated with the graphics display;
   and wherein when said pod is attached to said housing via said connector, said wireless transceiver is powered by said housing and is operable to transmit data from said memory to said computing device.

2. The hand-held wireless graphical input device of claim 1, further comprising:
   a power source in the housing for energizing the transceiver and memory.

3. The hand-held wireless graphical input device of claim 2 wherein the power source couples power through the USB connection to the memory.

4. The hand-held wireless graphical input device of claim 1 wherein said connector is a USB connector.

5. The hand-held wireless graphical input device of claim 1, wherein the memory further comprises flash memory for storing data.

6. A hand-held wireless graphical input device which provides a control signal to control translational movement of a cursor on a graphical user interface comprising:
   a housing adapted for being held by one hand in free space, generating said control signal using inertial sensors comprising vibrating elements, and transmitting said graphic input signals substantially only while an actuation button is depressed; and
   a pod detachably connected to the housing comprising a memory for storing data and a wireless transceiver, wherein when said pod is detached from said housing and connected to a computing device via said connector, said wireless transceiver is powered by said computing device and is operable to receive said control signal generated using said inertial sensors comprising vibrating elements in said housing and transmitting said control signal and said data to the computing device providing said graphical user interface, and wherein when said pod is attached to said housing via said connector, said wireless transceiver is powered by said housing and is operable to transmit data from said memory to said computing device;
   wherein said housing comprises a power source for energizing said transceiver and the memory; and a wireless transmitter for wirelessly transmitting the control signal.

7. The hand-held wireless graphical input device of claim 6 wherein said inertial sensors comprise:
   a first angular position inertial sensor for providing a first signal responsive to the rotation of the housing about a first axis, the first signal being responsive to the yaw of the housing for controlling translation movement of the cursor along a horizontal Cartesian coordinate of the computer active display; and
   a second angular position inertial sensor for providing a second signal responsive to the rotation of the housing about a second axis not parallel to the first axis, the second signal being responsive to the pitch of the housing for controlling translational movement of the cursor along a vertical Cartesian coordinate of the computer active display; and
   wherein the control signal comprises the first and second signals and the wireless transmitter wirelessly transmits the first and second signals.

8. The hand-held wireless graphical input device of claim 6 further comprising:
   a USB connection coupled between the power source and the transceiver and the memory.

9. The hand-held wireless graphical input device of claim 8, wherein the power source provides power through the USB connection to the memory.

10. The hand-held wireless graphical input device of claim 9, wherein the memory further comprises flash memory for storing digital data.

11. The hand-held wireless graphical input device of claim 7 wherein the first and second angular position inertial sensors are gyroscopes.

12. A memory unit comprising:
a housing adapted for being held by one hand in free space, generating graphic input signals using inertial sensors comprising vibrating elements, and transmitting said graphic input signals substantially only while an actuation button is depressed; and
a pod, detachable from said housing, comprising a wireless transceiver for transmitting and receiving signals and a memory for storing data, wherein when said pod is detached from said housing and connected to a computing device, said wireless transceiver is operable to receive said graphic input signals generated using said inertial sensors comprising vibrating elements from said housing and transmit the graphic input signals and data from said memory to said computing device and wherein when said pod is attached to said housing via said connector, said wireless transceiver is powered by said housing and is operable to transmit data from said memory to said computing device.

13. The memory unit of claim 12 further comprising a USB connection coupled to the memory.

14. The memory unit of claim 13 wherein the memory is coupled to receive power through the USB connection.

15. The memory unit of claim 14 wherein the memory further comprises flash memory for storing data.

16. A wireless remote control device, said device comprising:
a housing configured to be held and manipulated by a user in free space;
a sensor comprising a vibratory structure contained within said housing, said sensor detecting a movement of the housing in free space and generating a signal based on said detected movement;
a transmitter contained within said housing and connected to said sensor, said transmitter transmitting said signal generated by said sensor substantially only when an actuation button is depressed; and
a pod detachably connected to said housing, said pod containing a transceiver for receiving said signal transmitted by said transmitter, wherein when said pod is detached from said housing and connected to a computer, said wireless transceiver is operable to transmit said signal generated by said sensor comprising a vibratory structure and received from said transmitter in said housing to said computer, and wherein when said pod is attached to said housing via said connector, said wireless transceiver is powered by said housing and is operable to transmit data from said memory to said computing device.

17. The device of claim 16, wherein said pod further contains a memory for storing data received by said memory when said pod is detached from said housing.

18. The device of claim 17, wherein said memory has a computer controlling program stored thereon, said memory transmitting said program to said computer when said pod is disconnected from said housing and connected to said computer, said program controlling said computer in response to said signal being received by said transceiver of said pod.

19. The device of claim 16, wherein said pod is detachably connected to said housing using a USB connection.

20. The device of claim 16, said device further comprising:
a power source contained within said housing, said power source providing power to said pod when said pod is detachably connected to said housing.

* * * * *